United States Patent
Gupta et al.

(10) Patent No.: US 8,660,245 B2
(45) Date of Patent: Feb. 25, 2014

(54) METHODS, SYSTEMS, AND COMPUTER READABLE MEDIA FOR PROVIDING ADVERTISING-SUPPORTED CALL SERVICE

(75) Inventors: Nirmal K. Gupta, Gwalior (IN); Venkataramaiah Ravishankar, Cary, NC (US); Robert J. Sparks, Plano, TX (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 1196 days.

(21) Appl. No.: 12/543,382

(22) Filed: Aug. 18, 2009

(65) Prior Publication Data

US 2010/0080371 A1   Apr. 1, 2010

Related U.S. Application Data

(60) Provisional application No. 61/089,723, filed on Aug. 18, 2008.

(51) Int. Cl.
*H04M 15/00* (2006.01)

(52) U.S. Cl.
USPC ............ 379/114.13; 379/114.01; 379/100.04; 379/121.02

(58) Field of Classification Search
USPC ......... 379/114.01–114.2, 266.09, 13, 100.04, 379/121.02
See application file for complete search history.

(56) References Cited

U.S. PATENT DOCUMENTS

| | | | |
|---|---|---|---|
| 4,850,007 A | 7/1989 | Marino et al. | |
| 5,448,625 A | 9/1995 | Lederman | |
| 5,652,784 A | 7/1997 | Blen et al. | |
| 6,545,987 B1 * | 4/2003 | Becher | 370/328 |
| 6,947,531 B1 * | 9/2005 | Lewis et al. | 379/114.13 |
| 6,977,997 B2 * | 12/2005 | Shioda et al. | 379/114.13 |
| 7,130,392 B2 | 10/2006 | Morton | |
| 2001/0012344 A1 | 8/2001 | Kwon | |
| 2002/0044639 A1 * | 4/2002 | Shioda et al. | 379/207.02 |
| 2002/0136377 A1 | 9/2002 | Stewart et al. | |
| 2005/0197105 A1 * | 9/2005 | McCann | 455/412.1 |
| 2005/0213518 A1 * | 9/2005 | Ahya et al. | 370/276 |
| 2006/0046759 A1 * | 3/2006 | Yoon et al. | 455/518 |
| 2007/0088851 A1 | 4/2007 | Levkovitz et al. | |
| 2007/0116227 A1 | 5/2007 | Vitenson et al. | |
| 2007/0127650 A1 | 6/2007 | Altberg et al. | |
| 2007/0165805 A1 | 7/2007 | Altberg et al. | |
| 2007/0274476 A1 * | 11/2007 | Wolmuth | 379/88.22 |
| 2008/0300969 A1 * | 12/2008 | Zhang et al. | 705/14 |

OTHER PUBLICATIONS

"Why You'll Love Using Skype," Skype™, http://www.skype.com/intl/en-us/features/ (Downloaded from the Internet on Aug. 3, 2010).
"About Skype," Skype™, http://about.skype.com/ (Downloaded from the Internet on Aug. 3, 2010).
Notification of Transmittal of the International Search Report and the Written Opinion of the International Searching Authority, or the Declaration for International Application No. PCT/US2009/054205 (Mar. 30, 2010).
Sparks, "The Session Initiation Protocol (SIP) Refer Method," Network Working Group, RFC 3515 (Apr. 2003).

* cited by examiner

*Primary Examiner* — Duc Nguyen
*Assistant Examiner* — Yosef K Laekemariam
(74) *Attorney, Agent, or Firm* — Jenkins, Wilson, Taylor & Hunt, P.A.

(57) ABSTRACT

Methods, systems, and computer readable media for advertising-supported call service are disclosed. According to one method, a SIP call setup message associated with a first call from a calling subscriber to a called subscriber is received. It is then determined whether the calling subscriber subscribes to a play advertisement pay less (PAPL) service. In response to determining that the calling subscriber subscribes to the PAPL service, an advertisement is presented to the calling subscriber via the subscriber's telephone, the call is connected to the called subscriber, and a reduced charge is effected for the call based on the PAPL service.

57 Claims, 10 Drawing Sheets

METHODS, SYSTEMS, AND COMPUTER READABLE MEDIA FOR PROVIDING ADVERTISING-SUPPORTED CALL SERVICE

PRIORITY CLAIM

This application claims the benefit of U.S. Provisional Patent Application Ser. No. 61/089,723 filed Aug. 18, 2008; the disclosure of which is incorporated herein by reference in its entirety.

TECHNICAL FIELD

The subject matter described herein relates to call service. More specifically, the subject matter relates to methods, systems, and computer readable media for providing advertising-supported call service.

BACKGROUND

In spite of the efficiency gains made by modern telecommunications networks, many types of calls are more expensive than users may desire. For example, international calls are expensive and are typically billed by the minute. As a result, call volume and call duration is low for these calls.

Advertising is often used to subsidize the delivery of other types of media, such as radio and television broadcasts. However, no acceptable solution for providing advertising-supported call service has been created.

Accordingly, in light of these difficulties, a need exists for improved methods and systems for advertising-supported call service.

SUMMARY

Methods, systems, and computer readable media for advertising-supported call service are disclosed. According to one method, a SIP call setup message associated with a first call from a calling subscriber to a called subscriber is received. It is determined whether the calling subscriber subscribes to a play advertisement pay less (PAPL) service. In response to determining that the calling subscriber subscribes to the PAPL service, an advertisement is presented to the calling subscriber via the subscriber's telephone, the call is connected to the called subscriber, and a reduced charge is effected for the call based on the PAPL service.

A system for providing advertising-supported call service in a communications network is also disclosed. The system includes a communications module for receiving a SIP call setup message associated with a first call from a calling subscriber to a called subscriber. A PAPL module determines whether the calling subscriber subscribes to a PAPL service and, in response to determining that the calling subscriber has subscribed to the PAPL service, presents an advertisement to the calling subscriber via the subscriber's telephone, connects the call to the called subscriber, and effects a reduced charge for the call based on the PAPL service.

The subject matter described herein for advertising-supported call service may be implemented using a computer readable medium having stored thereon executable instructions that when executed by a processor of a computer control the computer to perform steps. Exemplary computer readable media suitable for implementing the subject matter described herein includes disk memory devices, chip memory devices, programmable logic devices, and application specific integrated circuits. In one implementation, the computer readable medium may include a memory accessible by a processor. The memory may include instructions executable by the processor for implementing any of the methods described herein. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for advertising-supported call service. Generally, advertising-supported call service may be provided to individual subscribers who subscribe to a play advertisement pay less (PAPL) service including both pre- and post-paid subscribers. If a subscriber wishes to make a call with reduced charges by listening to a brief advertisement, then the subscriber may add a prefix "1" to the called party number indicating that PAPL service is desired. When a subscriber subscribes to PAPL service, a subscriber profile may be added to the subscriber's HLR that includes a new service key associated with the PAPL service. A PAPL service function, such as the Tekelec service capability interaction manager, hereinafter, "TekSCIM", produced by Tekelec Inc. of Calabasas, Calif., may intercept an Initial Detection Point (IDP) message coming from the calling subscriber's mobile switching center (MSC) and use a multiple triggering capability to instruct the MSC to play an advertisement to the calling subscriber and, in the case of a pre-paid call, send another IDP message to the appropriate pre-paid service control point (SCP) for a credit check. IDP messages for subscribers that are not subscribed to the PAPL service are not processed by the TekSCIM function and may therefore travel to the SCP as usual. Further details for providing advertising-supported call service are provided hereinbelow.

Figure 1:
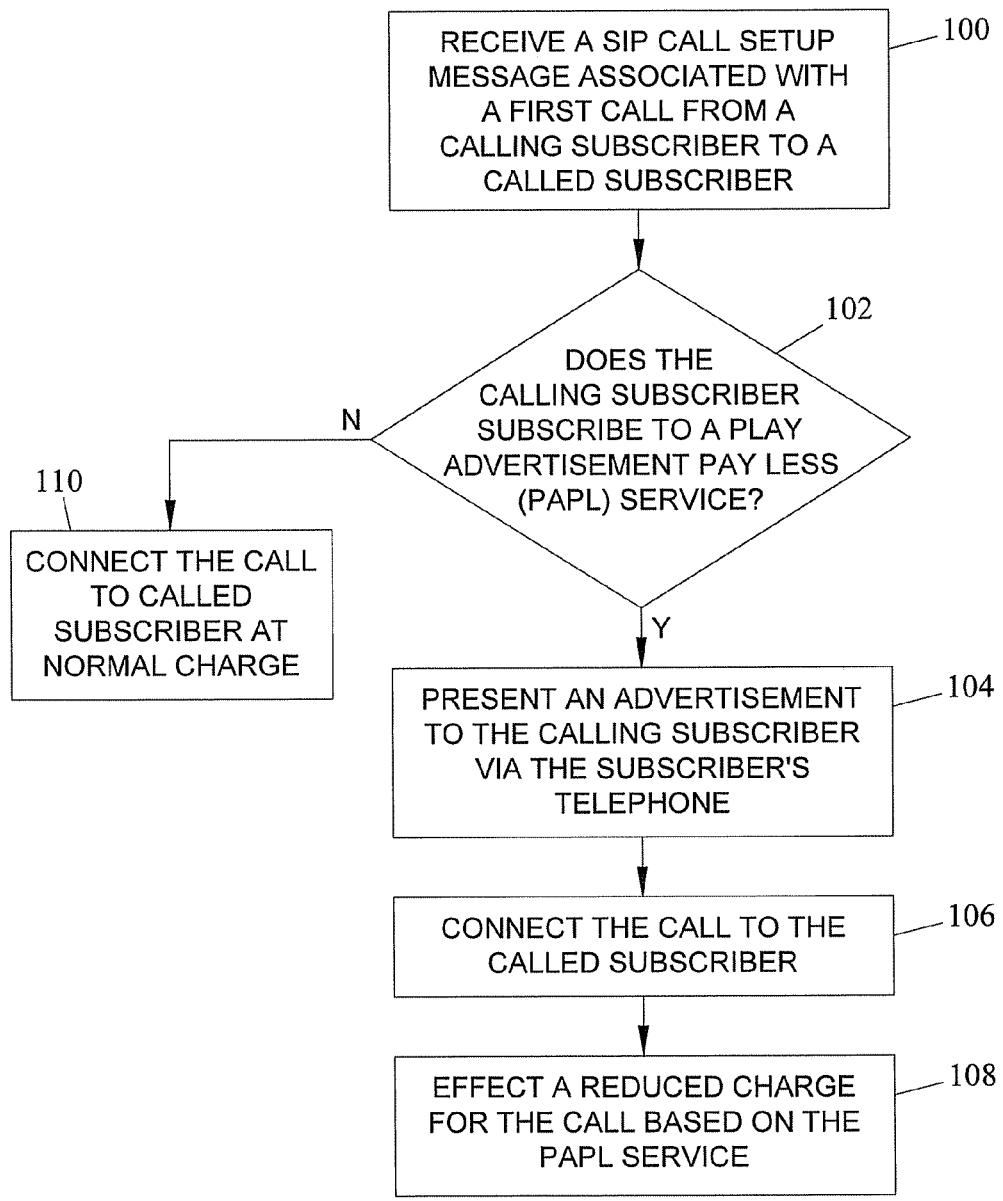
FIG. 1 is a flow chart showing exemplary steps for providing advertising-supported call service in a SIP communications network according to an embodiment of the subject matter described herein.

FIG. 1 is a flow chart of exemplary steps for providing advertising-supported call service in a SIP communications network. Referring to FIG. 1, in block 100, a SIP call setup message associated with a first call from a calling subscriber to a called subscriber is received. For example, a SIP INVITE message may be generated by a SIP user agent client, such as a mobile phone.

In block 102, it is determined whether the calling subscriber subscribes to PAPL service. For example, upon receiving a location update message for the calling subscriber from the MSC currently serving the calling subscriber, the HLR may access profile information associated with the calling subscriber that includes information specific to PAPL subscribers and return that information to the MSC. In one embodiment, it may be determined that a calling subscriber subscribes to PAPL service if the received location update message includes a specific prefix and/or the calling subscriber's number (or other identifier) is associated with PAPL service.

In block 104, in response to determining that the calling subscriber subscribes to the PAPL service, an advertisement may be presented to the calling subscriber via the subscriber's telephone. For example, before connecting the call to the called subscriber, an audio message may be played using an intelligent peripheral or similar device associated with the calling party's MSC.

In block 106, the call is connected to the called subscriber, and in block 108, a reduced charge for the call is effected based on the PAPL service. For example, after the advertisement has been played, one or more call setup signaling messages, such as INVITE, REFER, or re-INVITE message, may be sent in order to facilitate call setup between the calling subscriber and the called subscriber. In the case of a post-paid subscriber, a reduced charge may be effected by reducing the charge made on the calling subscriber's monthly bill. In the case of a pre-paid subscriber, the reduced charge may be effected by altering the amount of pre-paid credit deducted for the call at the subscriber's pre-paid SCP.

Returning to block 102, if alternatively, the calling subscriber does not subscribe to PAPL service, in block 110 the call may be connected to the called subscriber in a conventional manner without effected a reduced charge for the call.

Figure 2:
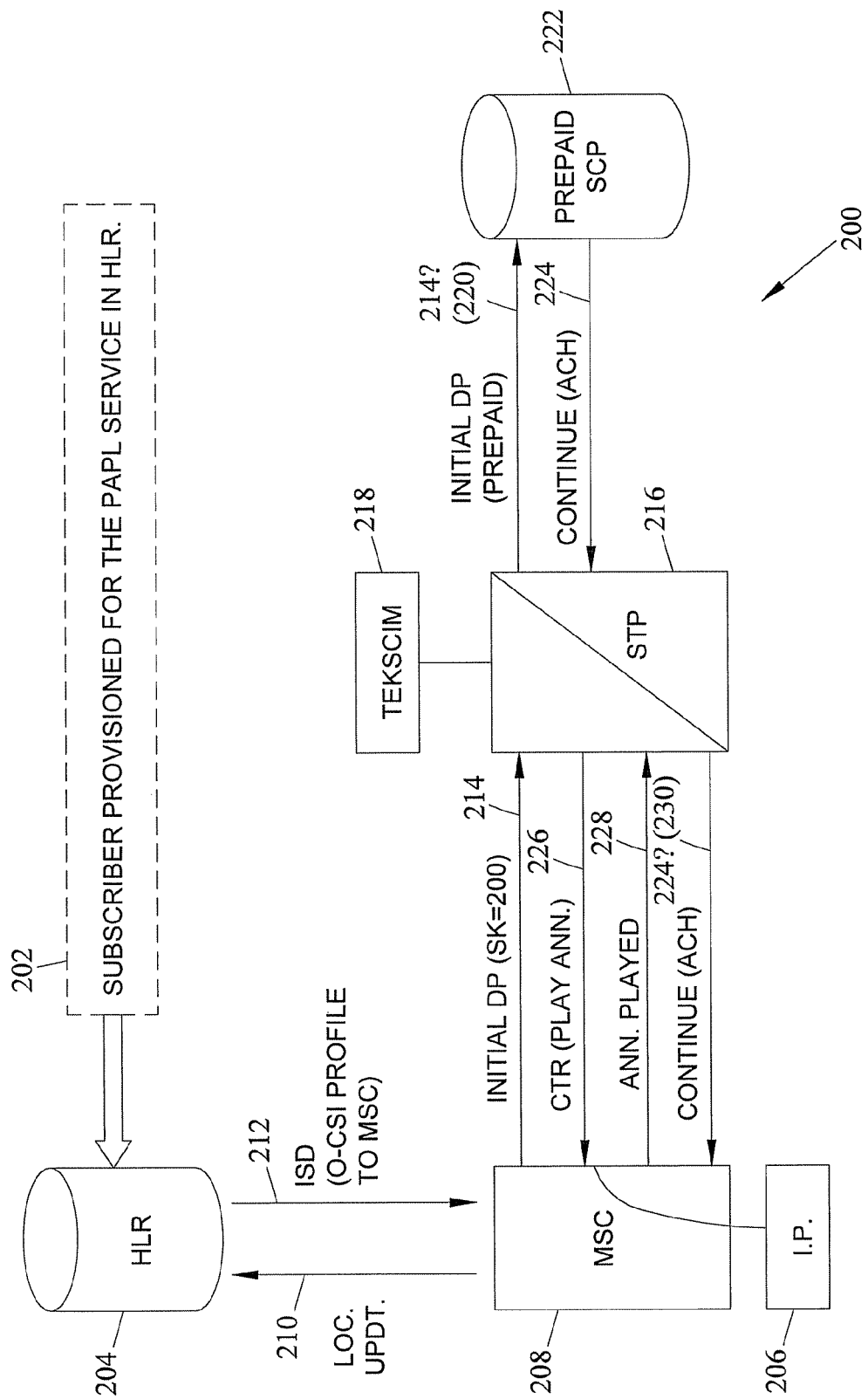
FIG. 2 is a network diagram and exemplary messaging sequence for providing pre-paid advertising-supported call service according to an embodiment of the subject matter described herein.

FIG. 2 is a diagram illustrating pre-paid advertising-supported call service according to an embodiment of the subject matter described herein. Referring to FIG. 2, system 200 may include exemplary telecommunications entities for providing pre-paid calling service to pre-paid subscribers. Initially, in step 202, a subscriber may be provisioned for PAPL service in his or her home location register (HLR) 204. For example, PAPL provisioning may include populating HLR 204 with originating-CAMEL subscription information (O-CSI) that includes a service control function (SCF) address and a service key associated with PAPL service. In one exemplary embodiment, the SCF address may include the address of a TekSCIM function. Likewise, the service key used may be a new service key, such as SK=200 (IDP_Adv_Prepaid) for indicating prepaid PAPL service. It is appreciated that different service keys may be provisioned for pre-paid and post-paid subscribers.

When a calling subscriber (not shown) initiates a call, an MSC currently serving the calling party may send an update location message to the calling party's HLR. For example, when the calling subscriber (not shown) places a call, MSC 208 may send Update_Location message 210 to HLR 204. In response to receiving Update_Location message 210, HLR 204 may determine the O-CSI profile associated with the calling subscriber (not shown) and return that information to MSC 208. As shown in FIG. 2, HLR 204 may then generate and send Insert_Subscriber_Data (ISD) message 212 including the O-CSI profile associated with the calling subscriber to MSC 208.

MSC 208 may next send an IDP message including the service key included in ISD 212 to a pre-paid SCP for a credit check. However, the IDP message may be intercepted by an intermediate STP, which may be associated with a TekSCIM function, in order to determine whether the calling subscriber subscribes to PAPL service and, if so, the TekSCIM/STP may hold the "Continue" message until an announcement has been played. For example, if TekSCIM 218 receives an IDP with SK=200, then TekSCIM 218 may forward (or instruct STP 216 to forward) IDP message 214 to pre-paid SCP 222 for a credit check. If pre-paid SCP 222 responds with an indication, such as a continue message, that the calling subscriber has enough available credit for the call, TekSCIM 218 may instruct MSC 208 to play an announcement. Alternatively, if SCP 222 responds with an indication that the subscriber does not have enough credit available, TekSCIM 218 may instruct MSC 208 to play an advertisement. It is appreciated that, as used herein, an announcement may be any message played to a party to a call and that an advertisement may include a specific type of announcement. However, the terms advertisement and announcement may be used interchangeably herein for sake of illustration without intending to limit the subject matter described herein to a specific type of announcement.

For example, intelligent peripheral (IP) 206 may be associated with MSC 208 and configured to play audio, video, text, or multimedia announcement and/or advertisement messages to a subscriber. The functionality of IP 206 may be realized, for example, using intelligent network application protocol (INAP) that sits above transaction capabilities application protocol (TCAP) in the SS7 protocol stack. It is further appreciated that other devices may be associated with MSC 208 and used to play announcements/advertisements for subscribers, such as an interactive voice response (IVR) server or a tone and announcement server (TAS).

After the announcement is played, MSC 208 may send a message to STP 216/TekSCIM 218 indicating that the announcement was played successfully. For example, MSC 208 may send Announcement Played message 228 to STP 216/TekSCIM 218. In response to receiving Announcement_Played message 228, STP 216/TekSCIM 218 may forward Continue message 224 to MSC 208 in order to allow the call between the calling subscriber and the called subscriber to be completed.

In this way, if a subscriber wishes to make a call with reduced and/or no charges, he or she may add a prefix (e.g., 1) to the called party number, listen to an announcement, and then place the call. It may be appreciated that several advantages exist for the subject matter described herein including, for example, that configuration changes for subscriptions are performed on the HLR. As a result, the TekSCIM need not be modified each time there is a new subscription, which reduces time, cost, and difficulty of subscription maintenance. Additionally, because the SCP handles reduced charging by examining the called party number (suitably prefixed as described above), the SCP does not need to handle any new messages or message types and thus does not experience any greater processing or storage load associated with implementing PAPL service.

In order to play different announcements to a given subscriber, various methods may be used. For example, in one embodiment, different service keys may be used for each announcement. For example, SK=200 may be used to play announcement_1, while SK=201 may be used to play announcement_2.

In another embodiment, TekSCIM 218 may be configured to check the calling party number to locate an associated announcement number. However, a potential drawback to this embodiment includes that it may require a large database, yet may nonetheless be suitable in some environments. Additionally, it is appreciated that there may be a need to determine whether the decision of an announcement number for a particular A-party number (i.e., calling party number), as described above, can be made at TekSCIM 218 or whether intervention by an SCP (e.g., pre-paid SCP 222) is required.

In yet another embodiment, the determination of the specific announcement to be played may be made based upon the current location of the calling subscriber. This location information may be obtained, for example, directly from the HLR associated with the calling subscriber, by intercepting mobility management messages, or by querying another type of subscriber location information database, location server, or presence server. Additionally, obtaining location information may include obtaining global positioning system (GPS) coordinates for a subscriber. The location information may also be cached by the TekSCIM function, or at the STP in embodiments where TekSCIM is co-located or integrated with an STP, without departing from the scope of the subject matter described herein.

Figure 3:
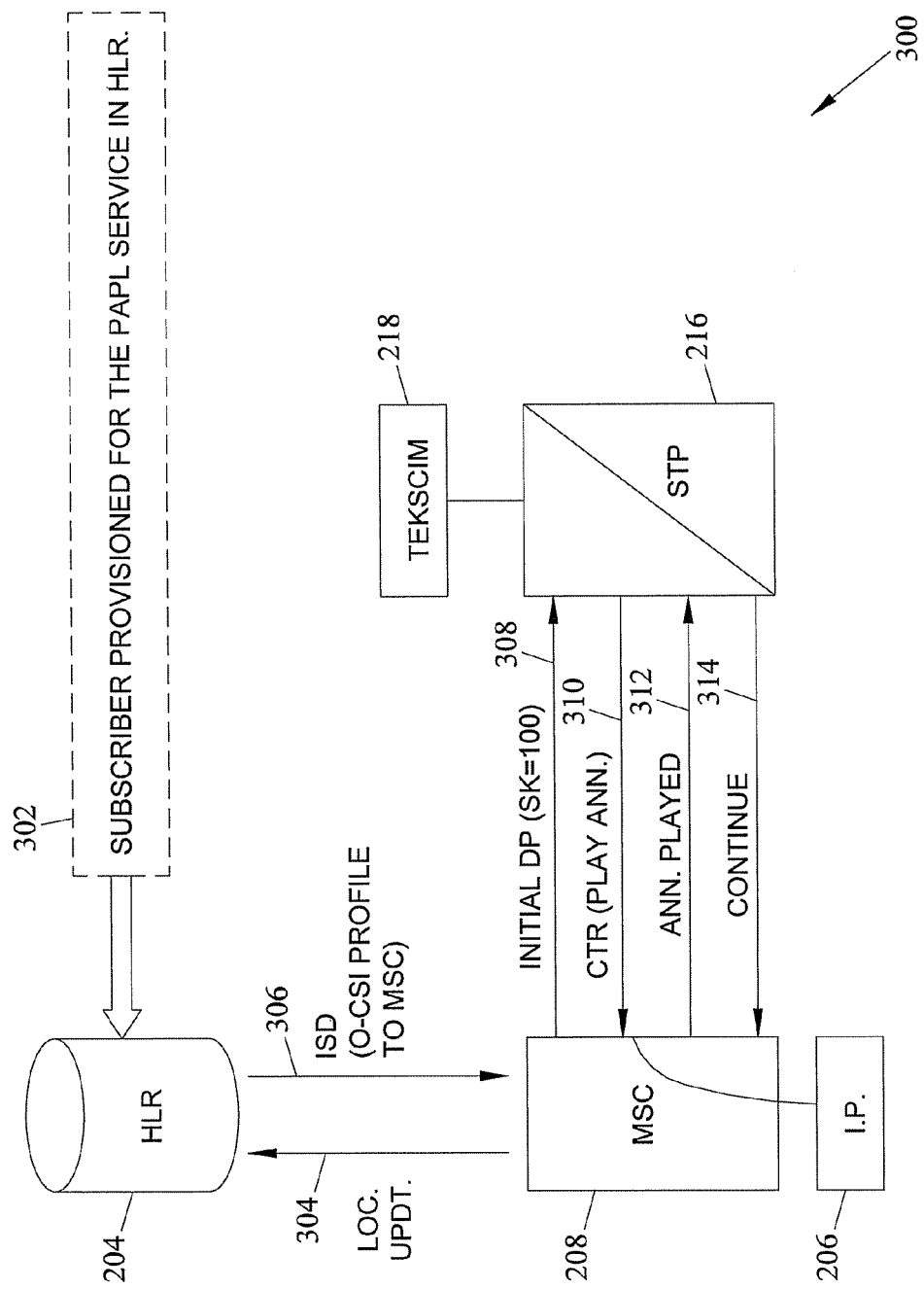
FIG. 3 is a network diagram and exemplary messaging sequence for providing post-paid advertising-supported call service according to an embodiment of the subject matter described herein.

FIG. 3 is a diagram illustrating post-paid advertising-supported call service according to an embodiment of the subject matter described herein. Referring to FIG. 3, system 300 may include exemplary telecommunications entities for providing post-paid calling service to post-paid subscribers. Initially, in step 302, a subscriber may be provisioned for play advertisement pay less (PAPL) service in home location register (HLR) 204 in a manner similar to that described above with respect to pre-paid PAPL service.

When a calling subscriber (not shown) attempts to place a call, MSC 208 may send Update Location message 304 to HLR 204. Based on information included in Update Location message 304, HLR 202 may retrieve ISD 306 that includes O-CSI profile information and return ISD 306 to MSC 208. In response to receiving ISD 306, MSC 208 may send an IDP message to STP 216/TekSCIM 218. For example, IDP message 308 may include SK=100 indicating a subscription to post-paid PAPL service.

In response to receiving IDP 308, and in particular in response to SK=100, TekSCIM 218 may determine an announcement to be played for the calling subscriber before facilitating call setup of the call to the original, specified called party. In the example scenario shown, TekSCIM 218 may instruct CTR message 310 to be sent to MSC 208 to play an announcement to the calling subscriber using IP 206. After the announcement has been played, a confirmation message (Announcement Played message 312) may be returned to TekSCIM 218/STP 216. Finally, TekSCIM 218/STP 216 may send Continue message 314 to MSC 208 for facilitating call setup of the requested call to be completed.

It is appreciated that the functionality described herein for providing PAPL service may be implemented on a variety of computing platforms. In one embodiment, a PAPL function may be associated with, integrated with, and/or co-located with a pre-paid service platform in a network. In another embodiment, a PAPL function may be operated in conjunction with a pre-paid service platform, but may be implemented on a platform or system that is separate from the pre-paid service platform. In yet another embodiment, a PAPL function may be implemented and/or operated in a network in such a way as to be independent of any pre-paid service(s) offered or deployed in the network. Additionally, it is appreciated that the subject matter described herein may be implemented in any data or communications network that utilizes SIP signaling. This may include, for example, Internet multimedia subsystem (IMS) networks and SIP next generation networks (NON).

In one embodiment, the PAPL function may generate usage and/or other measurement data associated with advertisement playback to calling subscribers. This data may be reported to, for example, one or more of: a network operations center, a pre-paid service platform/service center, an advertiser associated with the advertisement that was played, a billing center, a billing verification center, or other network data collection entity.

Additionally, PAPL service may be configured to deliver announcements having a variety of media types and/or formats. In one embodiment, the PAPL function may be configured to play an audio (e.g., voice) message to the calling subscriber, while in other embodiments, the PAPL function may be configured to play a video and/or multimedia message. For example, if a subscriber is calling from a conventional landline telephone, the announcement may be an audio-only announcement. However, if the subscriber is calling from a current mobile communications device, such as a cell phone with a display, the announcement may be a multimedia message including audio, video, and/or text. The process and exemplary configurations being described hereinabove with respect to FIGS. 1-3, several exemplary call flow scenarios for providing advertising-supported call service are described in greater detail below with respect to FIGS. 4-9.

Figure 4:
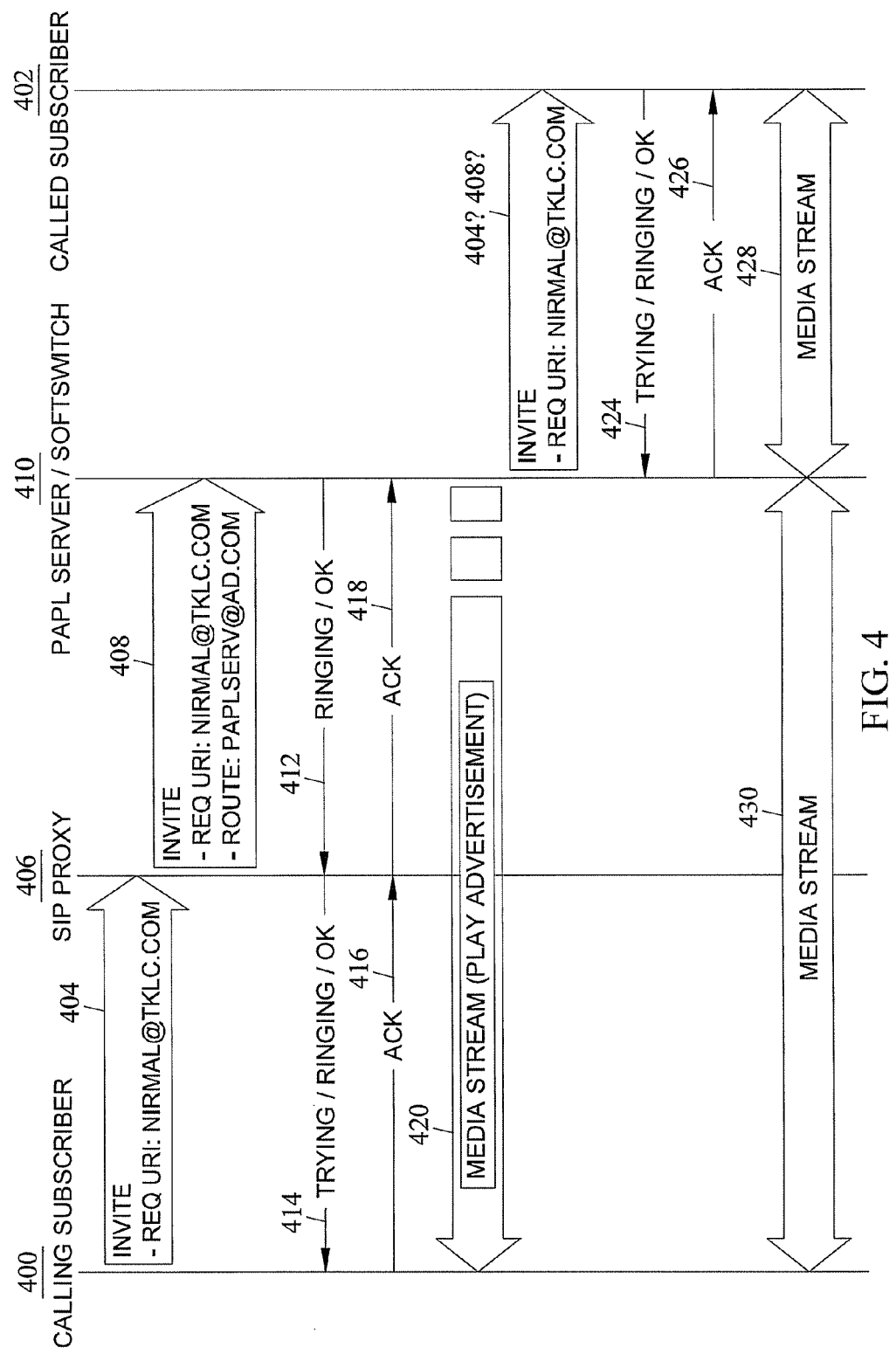
FIG. 4 is a call flow diagram illustrating advertising-supported call service in a softswitch-based SIP environment according to an embodiment of the subject matter described herein.

FIG. 4 is a call flow diagram illustrating advertising-supported call service in a softswitched SIP environment according to an embodiment of the subject matter described herein. Referring to FIG. 4, calling subscriber 400 (e.g., SIP UAC) may initiate a call to called subscriber 402 (e.g., SIP UAS) that may be identified by SIP address NIRMAL@TKLC.COM. For example, calling subscriber 400 may send SIP INVITE message 404 to SIP proxy 406 including requested uniform resource indicator (URI) NIRMAL@TKLC.COM.

Upon receiving INVITE message 404, SIP proxy 406 may forward INVITE message 408 including requested URI NIRMAL@TKLC.COM and route designation PAPLSERV@AD.COM to PAPL server/softswitch 410. PAPL server/softswitch 410 may then establish a session with calling subscriber 400, for example, by sending Ringing/OK message 412 to SIP Proxy 406, which may in turn send Trying/Ringing/OK message 414 to calling subscriber 400. In the example scenario shown, when calling subscriber accepts the session (e.g., by answering the call), ACK message 416 may be returned to SIP proxy 406, and ACK message 418 may be returned to PAPL Server/Softswitch 410.

In response to receiving ACK message 418, PAPL Server/Softswitch 410 may play media stream 420 including a designated announcement/advertisement. After the announcement has been played for calling subscriber 400, PAPL Server/Softswitch 410 may forward INVITE message 422 to called subscriber 402 in order to facilitate completion of the call. Thereafter, Trying/Ringing/OK message 424 may be sent from called subscriber 402 to PAPL Server/Softswitch 410, and ACK message 426 may be returned from PAPL Server/Softswitch 410 to called subscriber 402. Finally, a switching function associated with PAPL server 410 may bridge the two call "halves" of the media stream so as to establish a communication session between calling subscriber 400 and called subscriber 402. For example, media stream 428 may be established between PAPL Server/Softswitch 410 and called subscriber 402 and media stream 430 may be established between PAPL Server/Softswitch 410 and calling subscriber 400.

In an alternate embodiment, some or all of the call setup messages (e.g., INVITE) received by SIP 406 proxy may be routed to PAPL server 410 for PAPL service screening and/or discrimination. As such, only those calling subscribers that have subscribed to the PAPL service will be played an advertisement before placing a call.

Figure 5:
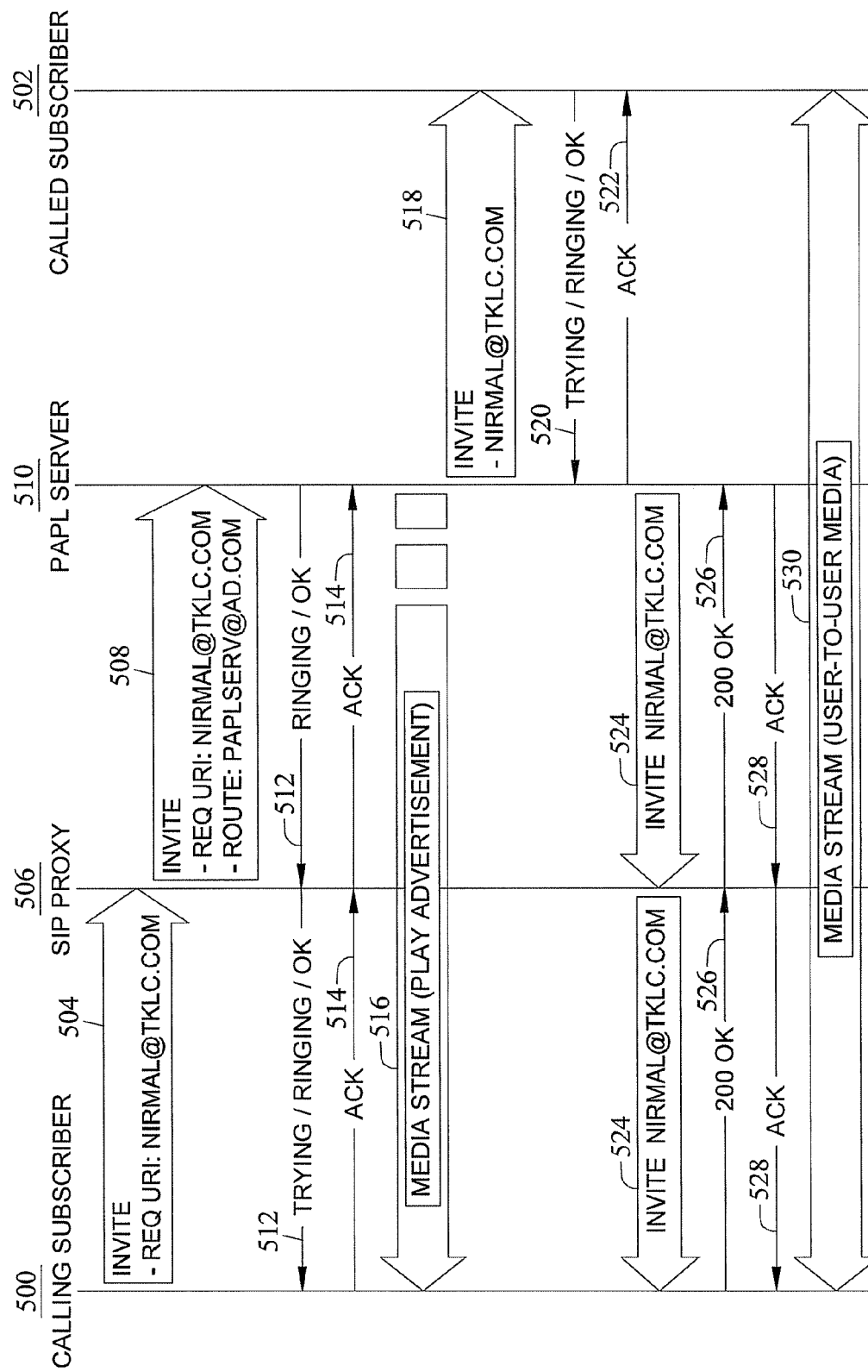
FIG. 5 is a call flow diagram illustrating advertising-supported call service that utilizes a SIP re-INVITE signaling mechanism to facilitate call setup according to an embodiment of the subject matter described herein.

FIG. 5 is a call flow diagram illustrating advertising-supported call service that utilizes a SIP re-INVITE signaling mechanism to facilitate call setup according to an embodiment of the subject matter described herein. Referring to FIG. 5, in a manner similar to that described above with respect to FIG. 4, calling subscriber 500 may initiate a call to called subscriber 502 who may be identified by SIP address NIRMAL@TKLC.COM. For example, calling subscriber 500 may send SIP INVITE message 504 to SIP proxy 506 that includes requested URI NIRMAL@TKLC.COM.

Upon receiving INVITE message 504, SIP proxy 506 may forward INVITE message 508 including requested URI NIRMAL@TKLC.COM and route designation PAPLSERV@AD.COM to PAPL server 510. PAPL server 510 may then establish a session with calling subscriber 500, for example, by sending Ringing/OK message 512 to SIP Proxy 506, which may in turn send Trying/Ringing/OK message 512 to calling subscriber 500. In the exemplary scenario shown, when calling subscriber 500 accepts the session, ACK message 514 may be returned to SIP proxy 506 and ACK message 514 may be returned to PAPL Server 510.

In response to receiving ACK message 514, PAPL Server 510 may play media stream 516 including a designated announcement/advertisement. After the announcement has been played for calling subscriber 500, PAPL Server 510 may forward INVITE message 522 to called subscriber 502 in order to facilitate completion of the call. Trying/Ringing/OK message 520 may be sent from called subscriber 502 to PAPL Server 510, and ACK message 522 may be returned to called subscriber 502.

PAPL server 510 may then utilize a SIP re-INVITE signaling mechanism to facilitate call setup to the originally specified called subscriber/user agent server (UAS) after the advertisement has been played to the calling subscriber. For example, INVITE message 524 may be forwarded from PAPL server 510 to calling subscriber 500 via SIP proxy 506. OK message 526 and ACK message 528 may then be exchanged between calling subscriber 500 and PAPL server 510 in order to confirm that the session may be established. Finally, in contrast to the two-leg scenario shown in FIG. 4, media stream 530 may be established directly between calling subscriber 500 and called subscriber 502.

Figure 6:
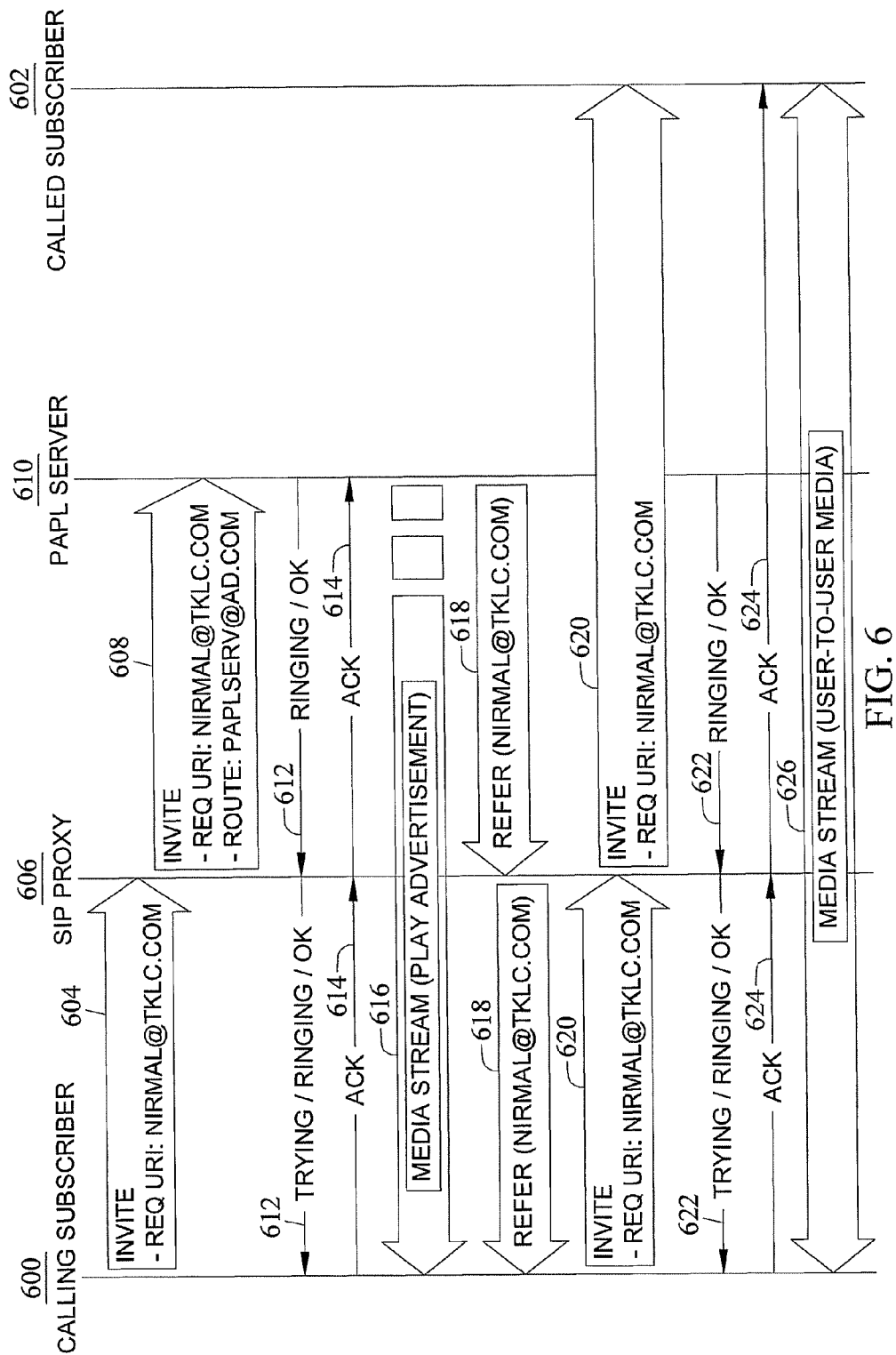
FIG. 6 is a call flow diagram illustrating advertising-supported call service that utilizes a SIP REFER signaling mechanism to facilitate call setup according to an embodiment of the subject matter described herein.

FIG. 6 is a call flow diagram illustrating advertising-supported call service that utilizes a SIP REFER signaling mechanism to facilitate call setup according to an embodiment of the subject matter described herein. Referring to FIG. 6, in a manner similar to that described above with respect to the scenario shown in FIGS. 4 and 5 above, calling subscriber 600 may initiate a call to called subscriber 602 who may be identified by SIP address NIRMAL@TKLC.COM. For example, calling subscriber 600 may send SIP INVITE message 604 to SIP proxy 606 that includes requested URI NIRMAL@TKLC.COM.

Upon receiving INVITE message 604, SIP proxy 606 may forward INVITE message 608 including requested URI NIRMAL@TKLC.COM and route designation PAPLSERV@AD.COM to PAPL server 610. PAPL server 610 may then establish a session with calling subscriber 600, for example, by sending Ringing/OK message 612 to SIP Proxy 606, which may in turn send Trying/Ringing/OK message 612 to calling subscriber 600. In the exemplary scenario shown, when calling subscriber 600 accepts the session, ACK message 614 may be returned to SIP proxy 606 and ACK message 614 may be returned to PAPL Server 610.

In response to receiving ACK message 614, PAPL Server 610 may play media stream 616 including a designated announcement/advertisement. However, in contrast to previous embodiments described above, PAPL server 610 may next send a SIP REFER message including SIP URI: NIRMAL@TKLC.COM to calling subscriber 600 in order to facilitate call setup to the originally specified called subscriber/UAS after the advertisement has been played to the calling subscriber. For example, PAPL server 610 may send REFER message 618 to calling subscriber 600 via SIP Proxy 606. Upon receiving REFER message 618, calling subscriber may send a second INVITE MESSAGE requesting the same URI as requested in first INVITE message 604. For example, INVITE message 620 may be sent from calling subscriber 600 to called subscriber 602 via SIP proxy 606, without being intercepted or processed by PAPL server 610.

PAPL Server 610 may then facilitate completion of the call by ringing calling subscriber 600. For example, trying/Ringing/OK message 622 may be sent from PAPL Server 610 to calling subscriber 600, however ACK messages 624 may be returned to called subscriber 602 via SIP Proxy 606 and bypassing PAPL server 610. Finally, media stream 626 may be established directly between calling subscriber 600 and called subscriber 602.

Figure 7:
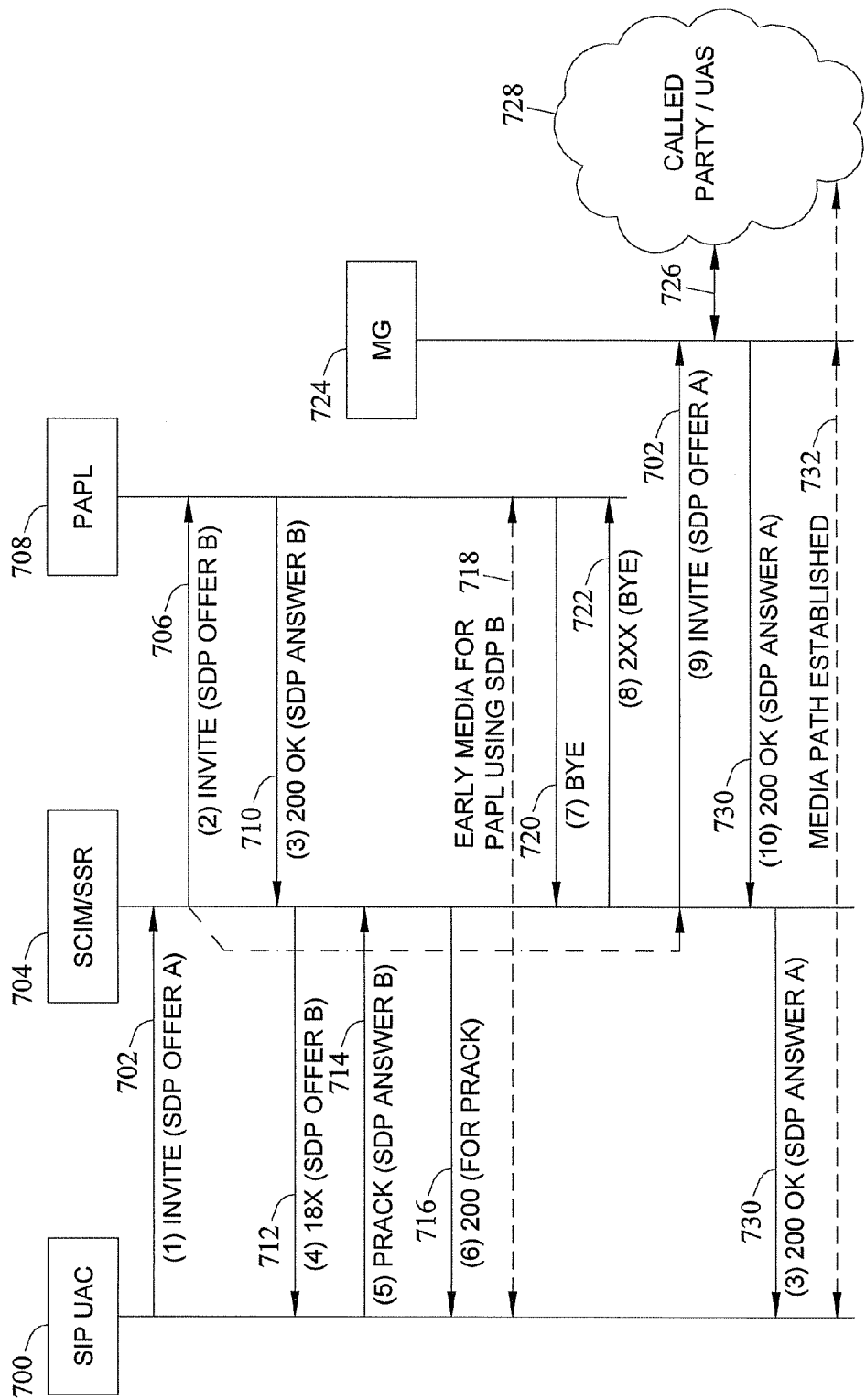
FIG. 7 is a network diagram and exemplary messaging sequence for providing advertising-supported call service that utilizes 18x provisional SIP extensions on behalf of a MG/MGC/softswitch according to an embodiment of the subject matter described herein.

FIG. 7 is a network diagram and exemplary messaging sequence for providing advertising-supported call service where the SCIM function implements 18x provisional SIP extensions on behalf of a MG/MGC/softswitch according to an embodiment of the subject matter described herein. Referring to FIG. 7, SIP UAC 700 may initiate a call by transmitting SIP INVITE message 702 including SDP offer A to SCIM 704. Based on one or more parameters in INVITE message 700, SCIM 704 may determine that PAPL services are required. Therefore, SCIM 704 may send INVITE message 706 that includes SDP offer B to PAPL server 708. If PAPL server 708 accepts SDP offer B, then SCIM 704 may signal UAC 700 using a provisional 18x SIP message that includes SDP offer B. For example, upon receiving 200 OK message 710 from PAPL server 708, SCIM 704 may send 18x message 712 for SDP offer B to UAC 700.

If UAC 700 accepts SDP offer B (e.g., by sending PRACK message 714 to SCIM 704 to which SCIM 704 returns 200 OK message 716), then an early media session 718 may be established between UAC 700 and PAPL 708 where, for example, an announcement may be played.

Once the announcement has been played, PAPL 708 may end the early media transaction by sending BYE message 720 to SCIM 704, and SCIM 704 may return corresponding 200 OK message 722 acknowledging BYE message 720. SCIM 704 may then forward INVITE message 702 to media gateway (MG) 724 for SDP offer A corresponding to INVITE message 702 originally received from UAC 700.

MG 724 may then exchange SIP signaling 726 with called party/user agent server (UAS) 728 to establish a dialog with the called party. Once the dialog is established, MG 724 may send 200 OK message 730 for SDP answer A to SCIM 704 in order to establish media path 732 between UAC 700 and the called PSTN subscriber. Thus, the subject matter described herein provides advertising-supported call service where the SCIM function implements 18x provisional SIP extensions on behalf of a MG/MGC/softswitch.

Figure 8:
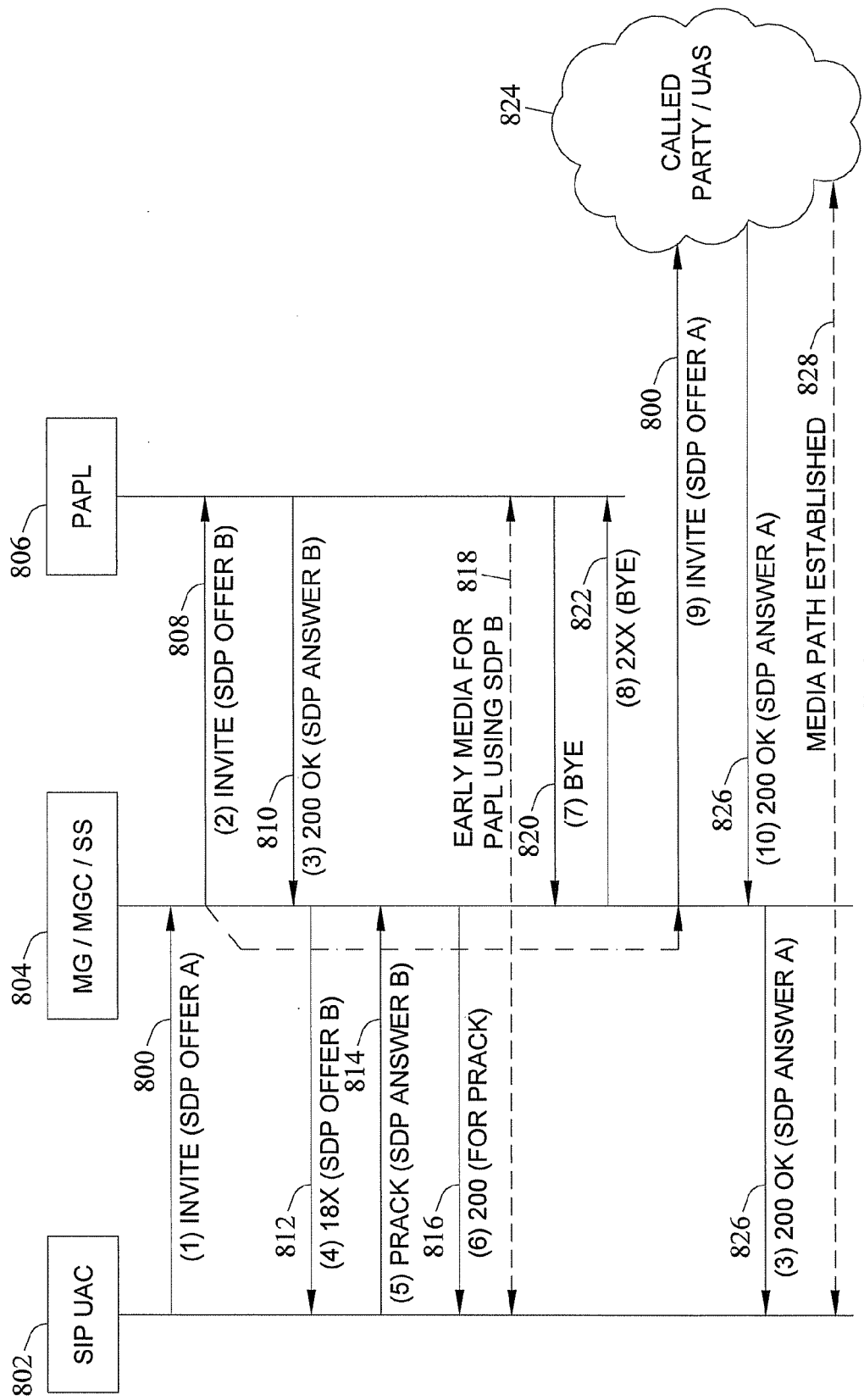
FIG. 8 is a network diagram and exemplary messaging sequence illustrating an MG/MGC/softswitch that implements 18x provisional SIP extensions for providing advertising-supported call service according to an embodiment of the subject matter described herein.

FIG. 8 is a network diagram and exemplary messaging sequence where the MG/MGC/softswitch implements 18x provisional SIP extensions for providing advertising-supported call service according to an embodiment of the subject matter described herein. Referring to FIG. 8, a media gateway/media gateway controller (MGC)/softswitch may be configured to implement 18x SIP extensions in order to facilitate PAPL service. In this example, SIP INVITE message 800 including a first SDP offer A from calling SIP UAC 802 is received by MG/MGC/SS (MMS) 804. MMS 804 determines that PAPL services are required (may require accessing an external PAPL subscription database/server, or PAPL subscription info may be pre-provisioned at the MMS). MMS 804 signals the PAPL server/function using an INVITE message that includes a different SDP offer B. If PAPL server 806 accepts SDP offer B, then MMS 804 may signal UAC 802 using a provisional 18x SIP message that includes SDP offer B. If UAC 802 accepts the SDP offer B, (e.g., by sending 200 PRACK message 814) then a media session may be established between UAC 802 and PAPL server 806 and an advertisement may be played to UAC 802. Once PAPL server 806 is finished playing the advertisement, PAPL 806 may send BYE message 820 to MMS 804. MMS 804 may acknowledge BYE message 820 with 2xx message 822. MMS 804 may then signal UAS 824 (or UAS proxy) using original SIP INVITE message 800 (i.e., includes SDP offer A). If UAS 824 accepts SDP offer A, UAS 824 may respond with 200 OK message 826, and a media session may be established between UAC 802 and called subscriber 824.

Figure 9:
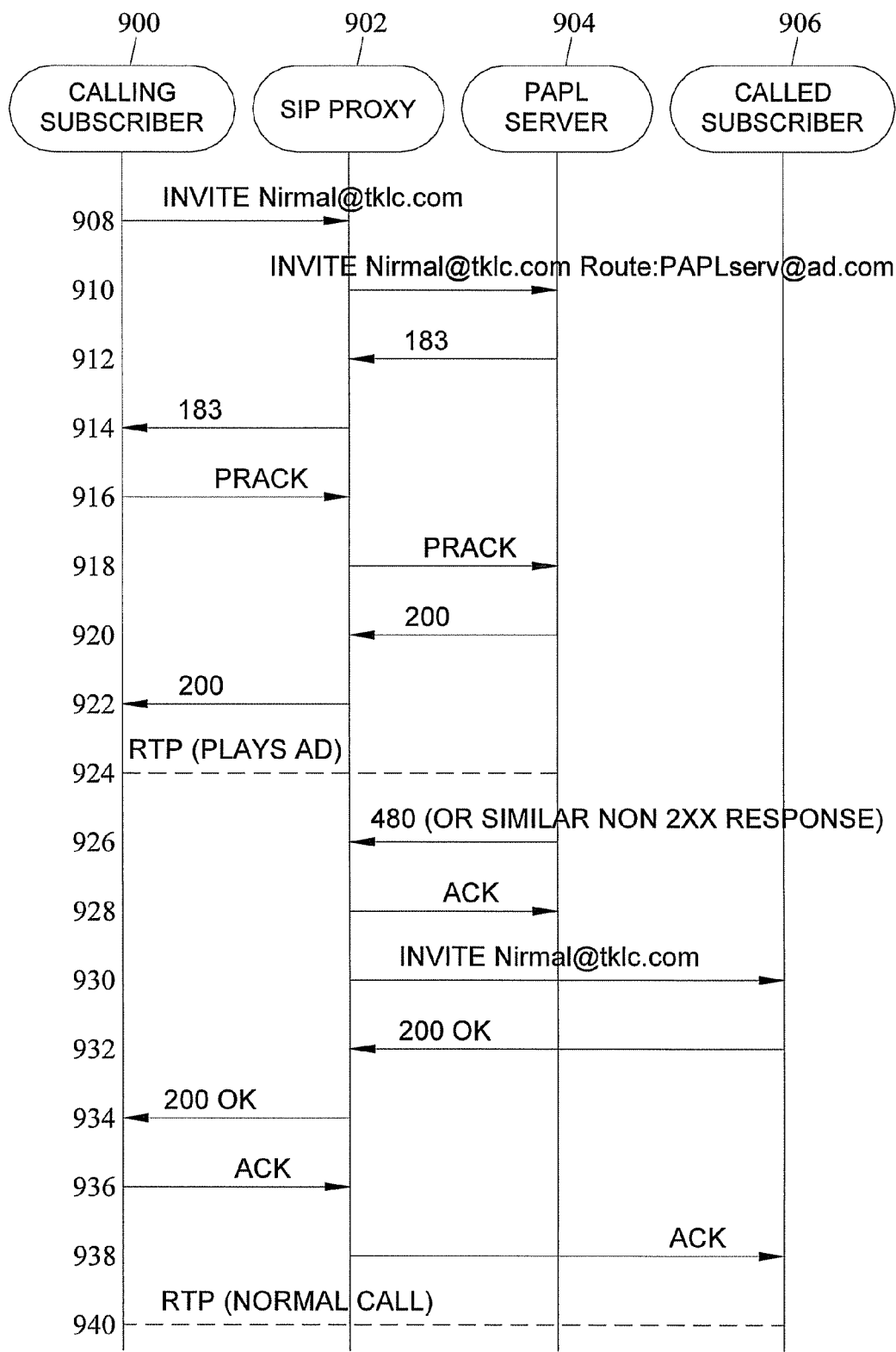
FIG. 9 is a call sequence diagram for providing advertising-supported call service according to an embodiment of the subject matter described herein.

FIG. 9 is a call sequence diagram for providing advertising-supported call service according to an embodiment of the subject matter described herein. Referring to FIG. 9, calling subscriber 900, SIP proxy 902, PAPL server 904, and called subscriber 906 may all be located in a communications network. At line 908, calling subscriber 900 may send an INVITE message including requested SIP URI: NRML@TKLC.COM to SIP proxy 902. Upon receiving the INVITE message, at line 910 SIP proxy 902 may forward the INVITE message including requested URI NIRMAL@TKLC.COM with route designation PAPLSERV@AD.COM to PAPL server 904. PAPL server 904 may respond with a SIP provisional message, such as 183 message at line 912, which is then forwarded to calling subscriber 900 at line 914. Calling subscriber 900 may then acknowledge the provisional 183 message by returning PRACK message to SIP proxy 902 at line 916, which may then be forwarded to PAPL server 904 at line 918. PAPL server 904 may then return a 200 OK message to calling subscriber 900 via SIP proxy 902, such as shown in lines 920 and 922.

At line 924, an advertisement may be played to the calling subscriber. For example, realtime transmission protocol (RTP) stream may be played to calling subscriber 900. After playing the advertisement, call setup may be facilitated with called subscriber 906. For example, at line 926, PAPL server 904 may send a SIP 480 (Temporarily Unavailable) message, or similar non-2xx response, to SIP proxy 902. At line 928, SIP proxy 902 may return an ACK message.

Next, SIP proxy 902 may forward the original INVITE message received at line 908 to called subscriber 906, who may respond by returning a 200 OK message at line 932. The 200 OK message received at line 932 may be forwarded to calling subscriber 900 at line 934, which may be acknowledged with ACK messages at lines 936 and 938. Finally, at line 940, call setup is complete and a conversation between calling subscriber 900 and called subscriber 906 may be held.

Figure 10A:
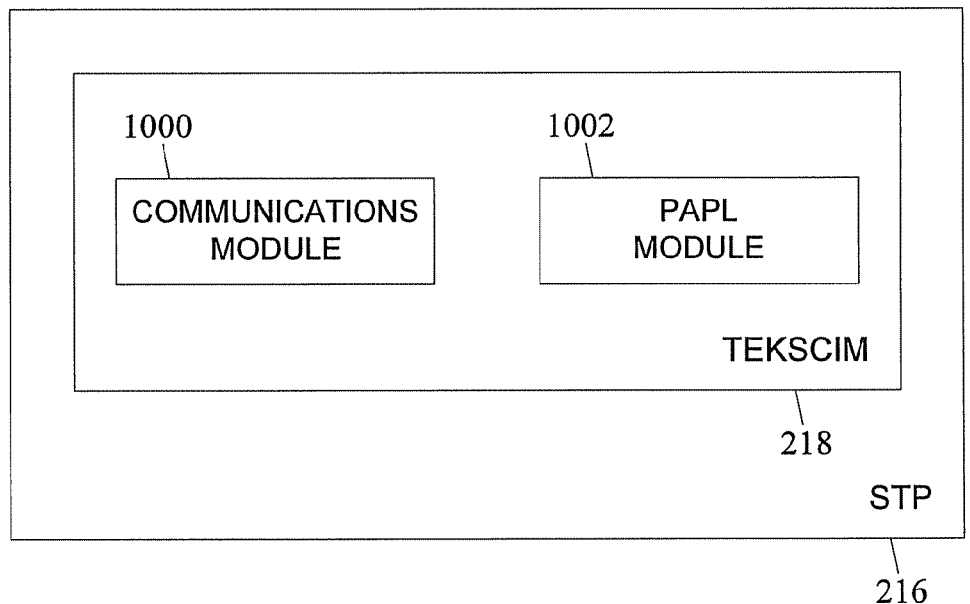
FIGS. 10A and 10B are functional block diagrams of an SS7-based signaling entity including an STP and a SIP-based signaling entity including a PAPL server/softswitch for providing pre-paid advertising-supported call service according to an embodiment of the subject matter described herein.
Figure 10B:
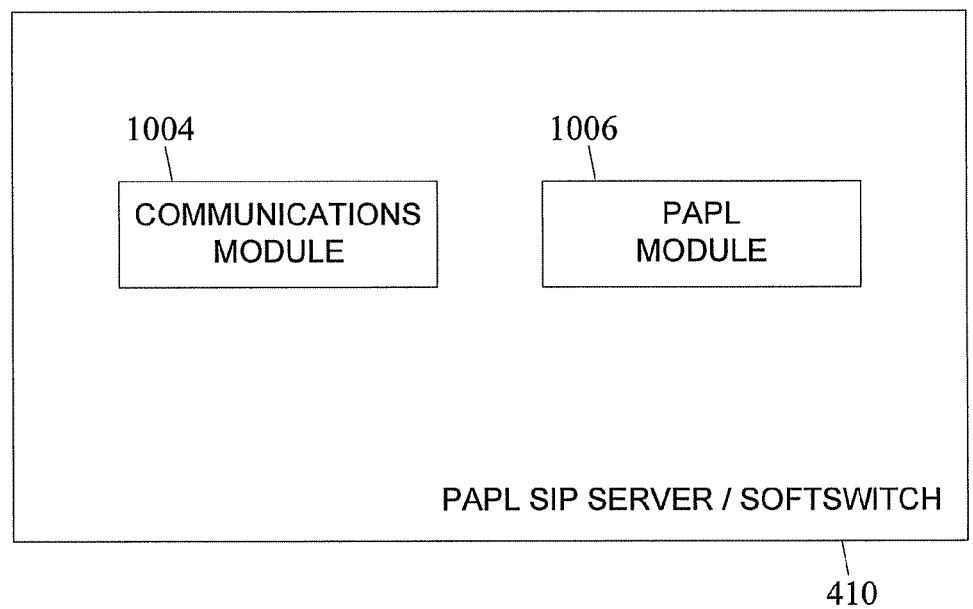

FIGS. 10A and 10B are functional block diagrams of an SS7-based signaling entity including an STP and a SIP-based signaling entity including a PAPL server/softswitch for providing pre-paid advertising-supported call service according to an embodiment of the subject matter described herein. Referring to the embodiment illustrated in FIG. 10A, PAPL functionality may be integrated with STP 216 via TEKSCIM 218 rather than as a standalone entity as is shown in FIGS. 2 and 3. TEKSCIM module 218 may include a communications module 1000 for receiving a signaling system 7 (SS7) call setup message associated with a first call from a calling subscriber to a called subscriber, wherein the SS7 call setup signaling message includes a service key associated with a PAPL service. TEKSCIM module 218 may further include PAPL module 1002 for determining whether the calling subscriber subscribes to the PAPL service based on the service key and, in response to determining that the calling subscriber subscribes to the PAPL service, for presenting an audio advertisement to the calling subscriber via the subscriber's telephone, holding a Continue message from being sent to the sender of the call setup signaling message until the advertisement has been presented, connecting the call to the called subscriber, and effecting a reduced charge for the call based on the PAPL service.

Referring to FIG. 10B, communications module 1004 and PAPL module 1006 may be located at, integrated with, or otherwise operatively associated with a session initiation protocol (SIP)-based signaling node, such as a SIP server or softswitch. For example, communications module 1004 and PAPL module 1006 may be located at one of SIP-based PAPL servers 410, 510, 610, 708, 806, or 904. Communications module 1004 may be configured to receive a SIP call setup message associated with a first call from a calling subscriber to a called subscriber. PAPL module 1006 may be configured to present an advertisement to the calling subscriber via the subscriber's telephone, connect the call to the called subscriber, and effect a reduced charge for the call based on the PAPL service.

What is claimed is:

1. A method for providing advertising-supported call service in a session initiation protocol (SIP) communications network, the method comprising:
receiving a SIP call setup message associated with a first call from a calling subscriber to a called subscriber;
intercepting, at a node separate from a service control point (SCP), an initial detection point (IDP) message associated with the SIP call setup message, wherein the IDP message is sent in response to receiving, from a home location register (HLR), an insert subscriber data (ISD) message that includes a service key associated with a play advertisement pay less (PAPL) service, wherein the IDP message includes the service key;

determining, using the IDP message, whether the calling subscriber subscribes to the PAPL service; and in response to determining that the calling subscriber subscribes to the PAPL service:
presenting the advertisement to the calling subscriber via the subscriber's telephone;
connecting the call to the called subscriber; and
effecting a reduced charge for the call based on the PAPL service.

2. The method of claim 1 wherein connecting the call to the called subscriber includes acting as an intermediary between the calling subscriber and the called subscriber for the duration of the call.

3. The method of claim 1 wherein connecting the call to the called subscriber includes connecting the call directly between the calling subscriber and the called subscriber.

4. The method of claim 3 wherein connecting the call directly between the calling subscriber and the called subscriber includes sending a re-INVITE message to the calling subscriber.

5. The method of claim 1 wherein presenting the advertisement includes playing one of an audio message and a multimedia message.

6. The method of claim 1 wherein receiving the call setup message includes receiving an INVITE message.

7. The method of claim 1 comprising determining a location of the calling subscriber.

8. The method of claim 7 wherein determining a location of the calling subscriber includes one of querying a database, analyzing the call setup message, and obtaining global positioning system (GPS) coordinates.

9. The method of claim 7 wherein presenting the advertisement includes playing a message based on the location of the calling subscriber.

10. The method of claim 1 wherein presenting the advertisement includes playing a message based on the time of day.

11. The method of claim 1 wherein effecting a reduced charge for the call includes providing a lower flat rate for subscribers to the PAPL service.

12. The method of claim 1 wherein effecting a reduced charge for the call includes notifying a billing server of the reduced charge.

13. The method of claim 1 comprising generating usage measurement statistics associated with the advertisement and the call.

14. A system for providing advertising-supported call service in a session initiation protocol (SIP) communications network, the system comprising:
a communications module for receiving a SIP call setup message associated with a first call from a calling subscriber to a called subscriber; and
a play advertisement pay less (PAPL) module for intercepting, at a node separate from a service control point (SCP), an initial detection point (IDP) message associated with the SIP call setup message, wherein the IDP message is sent in response to receiving, from a home location register (HLR), an insert subscriber data (ISD) message that includes a service key associated with a play advertisement pay less (PAPL) service, wherein the IDP message includes the service key, determining, using the IDP message, whether the calling subscriber subscribes to the PAPL service, and, in response to determining that the calling subscriber has subscribed to the PAPL service, presenting an advertisement to the calling subscriber via the subscriber's telephone, connecting the call to the called subscriber, and effecting a reduced charge for the call based on the PAPL service.

15. The system of claim 14 wherein the communications module is configured to receive a SIP call setup signaling message associated with a pre-paid call.

16. The system of claim 14 wherein the communications module is configured to receive a SIP call setup signaling message associated with a post-paid call.

17. The system of claim 14 wherein the PAPL module is configured to act as an intermediary between the calling subscriber and the called subscriber for the duration of the call.

18. The system of claim 14 wherein the PAPL module is configured to connect the call directly between the calling subscriber and the called subscriber.

19. The system of claim 18 wherein the PAPL module is configured to send a re-INVITE message to the calling subscriber.

20. The system of claim 14 wherein the PAPL module is configured to play one of an audio message and a multimedia message.

21. The system of claim 14 wherein receiving the call setup message includes receiving an INVITE message.

22. The system of claim 14 the PAPL module is configured to determine a location of the calling subscriber.

23. The system of claim 22 wherein the PAPL module is configured to determining a location of the calling subscriber by one of querying a database, analyzing the call setup message, and obtaining global positioning system (GPS) coordinates.

24. The system of claim 22 wherein the PAPL module is configured to play a message based on the location of the calling subscriber.

25. The system of claim 14 wherein the PAPL module is configured to play a message based on the time of day.

26. The system of claim 14 wherein the PAPL module is configured to effect a reduced charge for the call by providing a lower flat rate for subscribers to the PAPL service.

27. The system of claim 14 wherein the PAPL module is configured to effect a reduced charge for the call by notifying a billing server of the reduced charge.

28. A non-transitory computer readable medium having stored thereon executable instructions that when executed by the processor of a computer control the computer to perform steps comprising:
receiving a session initiation protocol (SIP) call setup message associated with a first call from a calling subscriber to a called subscriber;
intercepting, at a node separate from a service control point (SCP), an initial detection point (IDP) message associated with the SIP call setup message, wherein the IDP message is sent in response to receiving, from a home location register (HLR), an insert subscriber data (ISD) message that includes a service key associated with a play advertisement pay less (PAPL) service, wherein the IDP message includes the service key;
determining, using the IDP message, whether the calling subscriber subscribes to the PAPL service; and
in response to determining that the calling subscriber subscribes to the PAPL service:
presenting an advertisement to the calling subscriber via the subscriber's telephone;
connecting the call to the called subscriber; and
effecting a reduced charge for the call based on the PAPL service.

29. A method for providing advertising-supported call service in a communications network, the method comprising:
receiving a signaling system 7 (SS7) call setup message associated with a first call from a calling subscriber to a called subscriber, wherein the SS7 call setup signaling message includes a service key associated with a play advertisement pay less (PAPL) service, wherein the SS7 call setup message is sent in response to receiving, from a home location register (HLR), an insert subscriber data (ISD) message that includes the service key;
determining whether the calling subscriber subscribes to the PAPL service based on the service key; and
in response to determining that the calling subscriber subscribes to the PAPL service:
presenting an audio advertisement to the calling subscriber via the subscriber's telephone;
holding, at a node providing the PAPL service, a Continue message from being sent to the sender of the call setup signaling message until the advertisement has been presented, wherein the node is an intermediate node separate from a service control point (SCP) or a pre-paid service platform and the Continue message indicates that the call can proceed and originates from the pre-paid service platform;
connecting the call to the called subscriber; and
effecting a reduced charge for the call based on the PAPL service.

30. The method of claim 29 wherein receiving the SS7 call setup signaling message includes receiving an SS7 call setup signaling message associated with a pre-paid call.

31. The method of claim 29 wherein receiving the SS7 call setup signaling message includes receiving the SS7 call setup signaling message associated with a post-paid call.

32. The method of claim 29 wherein the SS7 call setup signaling message includes an initial detection point (IDP) message.

33. The method of claim 29 wherein connecting the call to the called subscriber includes acting as an intermediary between the calling subscriber and the called subscriber for the duration of the call.

34. The method of claim 29 wherein connecting the call to the called subscriber includes connecting the call directly between the calling subscriber and the called subscriber.

35. The method of claim 29 wherein presenting the advertisement includes playing one of an audio message and a multimedia message.

36. The method of claim 29 comprising determining a location of the calling subscriber.

37. The method of claim 36 wherein determining a location of the calling subscriber includes one of querying a database, analyzing the call setup message, and obtaining global positioning system (GPS) coordinates.

38. The method of claim 29 wherein presenting the advertisement includes playing a message based on the location of the calling subscriber.

39. The method of claim 29 wherein presenting the advertisement includes playing a message based on the time of day.

40. The method of claim 29 wherein effecting a reduced charge for the call includes providing a lower flat rate for subscribers to the PAPL service.

41. The method of claim 29 wherein effecting a reduced charge for the call includes notifying a billing server of the reduced charge.

42. The method of claim 29 comprising generating usage measurement statistics associated with the advertisement and the call.

43. A system for providing advertising-supported call service in a communications network, the system comprising:
a communications module for receiving a signaling system 7 (SS7) call setup message associated with a first call from a calling subscriber to a called subscriber, wherein the SS7 call setup signaling message includes a service key associated with a play advertisement pay less (PAPL) service, wherein the SS7 call setup message is sent in response to receiving, from a home location register (HLR), an insert subscriber data (ISD) message that includes the service key; and
a PAPL module for:
determining whether the calling subscriber subscribes to the PAPL service based on the service key;
in response to determining that the calling subscriber subscribes to the PAPL service:
presenting an audio advertisement to the calling subscriber via the subscriber's telephone;
holding, at a node providing the PAPL service, a Continue message from being sent to the sender of the call setup signaling message until the advertisement has been presented, wherein the node is an intermediate node separate from a service control point (SCP) or a pre-paid service platform and the Continue message indicates that the call can proceed and originates from the pre-paid service platform;
connecting the call to the called subscriber; and
effecting a reduced charge for the call based on the PAPL service.

44. The system of claim 43 wherein the communications module is configured to receive an SS7 call setup signaling message associated with a pre-paid call.

45. The system of claim 43 wherein the communications module is configured to receive an SS7 call setup signaling message associated with a post-paid call.

46. The system of claim 45 wherein the SS7 call setup signaling message includes an initial detection point (IDP) message.

47. The system of claim 43 wherein the PAPL module is configured to present the advertisement by playing one of an audio message and a multimedia message.

48. The system of claim 43 wherein the PAPL module is configured to act as an intermediary between the calling subscriber and the called subscriber for the duration of the call.

49. The system of claim 43 wherein the PAPL module is configured to connect the call directly between the calling subscriber and the called subscriber.

50. The system of claim 43 wherein the PAPL module is configured to play one of an audio message and a multimedia message.

51. The system of claim 43 the PAPL module is configured to determine a location of the calling subscriber.

52. The system of claim 51 wherein the PAPL module is configured to determining a location of the calling subscriber by one of querying a database, analyzing the call setup message, and obtaining global positioning system (GPS) coordinates.

53. The system of claim 51 wherein the PAPL module is configured to play a message based on the location of the calling subscriber.

54. The system of claim 43 wherein the PAPL module is configured to play a message based on the time of day.

55. The system of claim 43 wherein the PAPL module is configured to effect a reduced charge for the call by providing a lower flat rate for subscribers to the PAPL service.

56. The system of claim 43 wherein the PAPL module is configured to effect a reduced charge for the call by notifying a billing server of the reduced charge.

57. A non-transitory computer readable medium having stored thereon executable instructions that when executed by the processor of a computer control the computer to perform steps comprising:
- receiving a signaling system 7 (SS7) call setup message associated with a first call from a calling subscriber to a called subscriber, wherein the SS7 call setup signaling message includes a service key associated with a play advertisement pay less (PAPL) service, wherein the SS7 call setup message is sent in response to receiving, from a home location register (HLR), an insert subscriber data (ISD) message that includes the service key;
- determining whether the calling subscriber subscribes to the PAPL service based on the service key; and
- in response to determining that the calling subscriber subscribes to the PAPL service:
  - presenting an audio advertisement to the calling subscriber via the subscriber's telephone;
  - holding, at a node providing the PAPL service, a Continue message from being sent to the sender of the call setup signaling message until the advertisement has been presented, wherein the node is an intermediate node separate from a service control point (SCP) or a pre-paid service platform and the Continue message indicates that the call can proceed and originates from the pre-paid service platform;
  - connecting the call to the called subscriber; and
  - effecting a reduced charge for the call based on the PAPL service.

* * * * *